(12) United States Patent
Busch (10) Patent No.: US 8,914,682 B2
(45) Date of Patent: Dec. 16, 2014

(54) APPARATUS AND METHOD FOR THE PROTECTION AND FOR THE NON-DESTRUCTIVE TESTING OF SAFETY-RELEVANT REGISTERS

(75) Inventor: Holger Busch, Brunnthal-Otterloh (DE)

(73) Assignee: Infineon Technologies AG, Neubiberg (DE)

( * ) Notice: Subject to any disclaimer, the term of this patent is extended or adjusted under 35 U.S.C. 154(b) by 182 days.

(21) Appl. No.: 13/602,357

(22) Filed: Sep. 4, 2012

(65) Prior Publication Data
US 2013/0061094 A1 Mar. 7, 2013

(30) Foreign Application Priority Data
Sep. 1, 2011 (DE) .......................... 10 2011 112 174

(51) Int. Cl.
*G06F 11/00* (2006.01)
*G06F 11/22* (2006.01)

(52) U.S. Cl.
CPC .................................. *G06F 11/2215* (2013.01)
USPC .............................................. 714/41; 714/30

(58) Field of Classification Search
USPC .......................................................... 714/41
See application file for complete search history.

(56) References Cited

U.S. PATENT DOCUMENTS

| | | | | |
|---|---|---|---|---|
| 5,319,792 A | * | 6/1994 | Ehlig et al. | 712/228 |
| 5,550,993 A | * | 8/1996 | Ehlig et al. | 712/229 |
| 5,862,366 A | * | 1/1999 | Schmidt et al. | 703/21 |
| 5,937,154 A | * | 8/1999 | Tegethoff | 714/30 |
| 7,650,209 B2 | * | 1/2010 | Fachinger et al. | 701/31.7 |
| 7,823,020 B2 | * | 10/2010 | Bishop et al. | 714/36 |
| 7,900,086 B2 | * | 3/2011 | Datta et al. | 714/11 |
| 2008/0126778 A1 | | 5/2008 | Bishop et al. | |
| 2008/0229166 A1 | * | 9/2008 | Datta et al. | 714/735 |
| 2012/0226942 A1 | * | 9/2012 | Gangasani et al. | 714/30 |

* cited by examiner

*Primary Examiner* — Kamini Patel
(74) *Attorney, Agent, or Firm* — Eschweiler & Associates, LLC (57) ABSTRACT

The present invention enables a safety management of safety measures as well as the non-destructive testing of safety-relevant registers which are required for the configuration of a system, wherein the test method according to the invention can be carried out during each operating phase of a system to be tested.

20 Claims, 3 Drawing Sheets

APPARATUS AND METHOD FOR THE PROTECTION AND FOR THE NON-DESTRUCTIVE TESTING OF SAFETY-RELEVANT REGISTERS

REFERENCE TO RELATED APPLICATION

This application claims priority to German Application number DE 10 2011 112174.2 filed on Sep. 1, 2011.

FIELD

The present invention refers to a method as well as an apparatus for the non-destructive testing of safety-relevant storage registers in electronic storage media which can be used for instance in vehicles.

BACKGROUND

In the present context, by a non-destructive testing of safety-relevant registers there is meant the testing of electronic storage registers the operability of which is not impaired by the test and the data content of which will correspond again to the original value after the test. Safety-relevant registers which, in the following, will also be referred to as safety registers, are storage registers in electronic storage media in which relevant data for the safety and the correct functioning of a system are stored.

In order to comply with automotive safety requirements according to the automotive safety integrity levels which are for instance defined in the functional safety standard ISO 26262 for road vehicles, various application-independent safety measures have to be taken in the hardware implementation of safety-relevant parts of vehicle microcontrollers. The functional safety standard defines specific maximum time intervals for fault tolerances in safety parts of the microcontroller and in the built-in safety mechanisms.

The influences of external events, as for instance mechanical actions or radioactive alpha radiation, can lead to inverted states in storage registers, whereby safety-relevant submodules may be controlled incorrectly and serious malfunctions of the complete vehicle controller may be effected. This can affect configuration registers as well as universal registers of relevant system components or particularly critical internal registers, as for instance finite state machines and counters. Consequently, such safety registers have to be highly protected by at least indicating, if not correcting, faults, and by issuing an alarm or the indication for the triggering or activation of a safety function or a safety mechanism, whereby a corresponding action or a safety function, for instance a system reset, will be triggered or activated. Such safety mechanisms, safety functions or safety measures can be configured in a so-called safety management unit.

In order to guarantee the functional safety standard, the non-availability of a safety mechanism has to be detected within a maximum time interval, wherein the maximum time interval usually corresponds to an average driving cycle of a vehicle of, for instance, several hours.

A testing of the safety measure can be carried out by simulating the possible external influence, for example, a radioactive radiation with alpha particles. This can be simulated by inverting safety register bits at least one time during a driving cycle, whereupon it can be checked whether corresponding alarms or safety mechanisms will be triggered as expected. One difficulty in this test requirement is the selection of the point of time at which such a safety test can be carried out in the system, as the test method can cause a detrimental influence on the normal function of the tested system.

The following alternatives in the selection of the point in time for the testing of the safety measure can lead to the following different problems:

A. When the test is performed after termination of the current driving cycle, it will not interfere with the normal operation of the tested system. It can not be guaranteed, however, that the safety function of the tested system will still be faultless when the next driving cycle is started. Thus, this alternative has a decisive drawback.

B. When the test is performed at a point of time within the driving cycle, it must not affect the normal function of the tested system. Hence, when the normal operation shall be maintained, the question arises, however, at what time important register bits, which are constantly required during the driving cycle, can be modified for test purposes, as it cannot be generally assumed that there are idle cycles during which the tested register bits are not needed. Furthermore, it has to be guaranteed that values or data stored in the tested register bits are restored after the test.

C. A test during the start of the system to be tested is only acceptable when basic configuration settings, as for instance for a clock control, which are required for the correct performing of the tests themselves, will not be impaired during the testing. Therefore it cannot suffice to modify the safety registers for the testing at random and to restore the reset values again after the tests. Furthermore, the testing of the safety measures for the storage registers must not require too many clock cycles, as the acceptable time interval for starting the system to be tested is limited. The taking into account of such dependencies can lead to a considerable complexity with regard to the software for starting the system together with a high risk of error.

Also, the costs that are caused by the storage space required for the safety registers and by the supply power pose a problem. Another challenge is to be able to flexibly increase or decrease the safety functions of the system with minimum expenditure or overhead in order to avoid a too high or too low protection by safety functions.

A further demand consists in the methodological problem that the protection or saving of the registers must not detrimentally affect the production time and the time of delivery which are required for the product to reach the customer. Consequently, the development or the configuration of the hardware and the verification plans must not be considerably burdened by an additional overhead for the implementation and verification of the safety logic.

Hitherto, the following basic approaches for the register saving have been known from prior art:

For CPU cores of, for instance, the AURIX product family there is provided a redundancy at the system level in that complete CPUs are duplicated and operate simultaneously. A special lockstep control logic enables the constant comparison of the outputs of the master CPU and of a redundant checker CPU with a configurable delay of checker inputs and master outputs, wherein the compare logic can be tested via separate test inputs.

If applied to a register saving, such an approach would correspond to the duplication of the entire sequence and combination logic for the calculation of the states of the saved registers. This would result in higher operating expenses and would not provide any flexibility for the selection of individual register bit fields for the protection of the register saving without modifying the architecture. Furthermore, only the compare logic would then be tested, but not the redundant registers.

Another known method is based on special redundancy codes (Error Correction Codes) and is used for the protection of RAM blocks as well as for the detection and correction of errors, wherein additional check bits are added to the data words by ECC encoders during writing and are checked by ECC decoders during reading which, based on the ECC configuration, are able to not only detect a certain number of bit errors but also to correct them up to a certain extent. Such an approach could also be used for the register saving. As the ECC protection, however, requires regulated memory structures with predefined word lengths, the design structure would have to be modified substantially in order to, one the one hand, insert the ECC logic itself, and, on the other hand, to arrange the register logic such that the required regularity is achieved. Such a restructuring would cause a higher design expenditure and would lack the desired flexibility.

So-called library cells with dual or triple modular redundancy are another known alternative which, however, would influence the design up to the synthesis, as in the case of duplication the register cells would have to be equipped with additional inputs and outputs for the testing and for the triggering of a safety function or of an alarm.

A triple modular redundancy would make it possible that the ports of the original register cells would be retained if no alarm were necessary, as the register outputs could be created by majority vote. The triple redundancy would, however, result in an increase in the costs in this area, and the exchange of library cells would have an enormous influence on the design flow and would require either a manual intervention or complex scripts.

The addition of check bits to registers is another possible approach. The resulting long chains of XOR gates would, however, increase the power consumption and the combinatorial propagation delays in the design. Moreover, an even number of simultaneous errors could have the effect that these errors could cancel each other so that no safety function or alarm function would be marked or selected. Finally, individual solutions for the implementation of hardware safety measures in each module would lead to extremely heterogeneous solutions which would be difficult to verify, to test and to certify.

Alternatively, the register could be protected by means of safety software, in that all write values for safety registers are additionally stored in another memory and are read therefrom and compared from time to time. If the repetition cycles are not too short with regard to the safety requirements, and if the software does not increase the load of the CPU too much, this approach would be acceptable. Not all registers, however, can be saved and protected by the safety software, as internal registers are out of reach for the software, and some externally visible registers are additionally updated by hardware so that the safety software could not decide whether a change has taken place owing to a regular hardware update or owing to an isolated case error.

SUMMARY

Hence, one goal of one embodiment of the present invention is to test configurable safety mechanisms or safety functions of a system without affecting the normal operation of the system to be tested and with deviating from the hitherto existing production process of the respective systems only as little as possible.

The goal is achieved in one embodiment by the fact that a test of the safety functions or safety measures or a check of the safety-relevant registers which are used for the configuration of an electronic control system can be carried out at any time, i.e. also during the normal operation of the system to be tested. Therefore, in each module which comprises such safety registers, at least one test controller is provided, respectively, which controls and monitors the occurrence of a register error in the respective module at any time.

Consequently, the inventive approach solves the above-described problems in that each module which contains safety-relevant storage registers comprises at least one test controller that detects the occurrence of an error in one of the safety registers of the respective module in each operating phase of the electronic control system. Through this and according to the invention, a very quick testing of the safety measures for safety-relevant registers in a few clock cycles, for instance in only 10 clock cycles, is rendered possible by the test controller in each module.

In this manner, configurable safety mechanisms or safety functions of a system can be tested without interfering with the normal operation of the system to be tested. Through this, a customer or user of the system can trigger himself or herself the tests of the safety functions at any time and also several times during a driving cycle. It is then even possible to employ the microcontroller which is equipped with the test function according to the invention also in other business areas than in the automobile sector, for instance in the industry or in the multimarket where the equivalent to the driving cycle of a vehicle can extend over periods of time which are definitely longer than only a few hours.

The test controller according to the invention supplies test data simultaneously to all safety register bits of the respective module. An alarm generation logic is assigned to each sub-component at safety registers, and an alarm combination logic in each hierarchical component handles alarms from different sources. Combined alarms are coupled or fed back through the hierarchy to the test controller which compares the incoming highest collective alarm with the value expected in the current test state and constantly monitors the occurrence of an alarm during normal operation. Furthermore, the tests can correspondingly be offset with respect to each other by the integration of a latency. A global alarm signal can be generated for each module and can be forwarded to a safety management unit where configurable actions like a reset of the system or interruptions of operating functions can be triggered.

During testing, the test data can be used in encapsulated assignments in order to invert the original values in duplicated registers in order to trigger defined alarms. A corresponding read function can retrieve the correct register value at any time, and that independent of whether a test is just being carried out or whether the normal operating mode of the tested system is set.

Additionally, a special read function for triplication with two redundant registers can be provided which returns a corrected majority read value to the test controller when safety registers are to be protected with correction.

In all embodiments of the present invention, the read value is assigned to an original signal which previously represented the respective safety register before the saving or protection was added. In this manner, the signal maintains the original functional behavior and can therefore be used without any modifications in all operations in which the respective register is read.

In a method for updating the register, all assignment particulars or information are replaced by predefined assignment functions which use the assignment values and the test state as parameters and, together with the read function, ensure that the original functional design behavior will be maintained completely.

The gentle approach enables the developer or design engineer to reduce the expenditure or overhead for safety registers by using predefined VHDL library elements which comprise the entire register saving functionality. As these functions are already preverified, the safety verification can concentrate on the complete application of the functions to all assignments. Corresponding automated verification functions enable a fast detection of each error in the safety improvements of existing VHDL designs.

A further flexibility is achieved by equipping all register assignment functions, read functions and alarm functions with centrally defined mask parameters in order to indicate which bits of storage registers are to be saved. The mask parameters are defined for each register in a packet file, wherein all changes thereat are automatically effective in the entire design of the system. As the saving functionality is implemented in centrally provided functions and methods, the elements can be easily replaced without having to change other codes. The redundant registers can, for instance, be implemented with or without negation.

As the approach only influences the VHDL design, no further measures have to be taken in the remaining design flow up to the layout.

Thus, the register saving approach according to the invention combines several elements:

In each module of a system to be saved and protected there is provided a test controller for generating and supplying test data which are input simultaneously into all safety registers.

The test data can be used for a destructive testing where the register content is lost after the test, as well as for a non-destructive testing in which the effective register behavior is identical to the original one.

Furthermore, there is provided a test control logic which compares a generated or incoming alarm with an expected alarm and generates global test alarm and alarm signals therefore which are forwarded to a safety management unit.

Furthermore, the tests can be correspondingly offset with respect to each other by the integration of a latency.

Write functions assign values or data with or without inversion to the register and its duplicate based on the test procedure so that at certain points of time either all bits are identical or different.

Alarm functions check whether differences between the registers and their duplicates correspond to the current test state.

Each individual alarm signal comprises three elements, a first element of which corresponds to the presence of at least one alarm and a second element of which corresponds to the presence of all set alarms. When there is an alarm, but not all alarms are set, this is an indicator for an error. A third element indicates whether the combined result is to be taken into account in the further processing.

According to a further aspect of the present invention, safety registers and redundant duplicates are of a uniform type so that the same predefined functions and methods can be used. Type conversion functions convert from and to original register types when necessary, e.g. for enumeration types in std_ulogic vectors.

Read functions can retrieve the correct register values through negation register contents based on the current test state at any time.

So-called masks make it possible that individual bits of safety registers are selected or deselected for hardware protection. Bits of redundant registers, which were deselected according to the masks, can be eliminated by optimization. Thereby the masks render possible a fair balance between hardware and software protection of individual register bits. R bits and RW bits of safety registers can be protected by hardware. Bit field types which can be updated by software can, however, not be protected by software, as internal critical registers can only be protected by hardware.

Analogous assignment functions and alarm functions for triplication (by means of two or more redundant registers) are available on demand with corresponding read functions which enable a correction through a majority decision.

Hence, the approach according to the invention can lead to the following advantages:

The use or the operation of the system to be tested is not affected by the testing but can continue in the normal operation.

The user or customer can decide on his or her own at any time whether and when the test method shall be carried out.

The test of all safety registers can be performed in a few clock cycles so that the safety requirement of the checking of the safety measure at least once per driving cycle can easily be fulfilled.

Area and power consumption can be reduced by using only a simple redundancy (by means of one redundant register) for the detection instead of a dual redundancy (by means of two redundant registers) which would be required by an additional correction.

As all functions and methods are present in a VHDL packet which every module with safety registers must contain, the uniform approach reduces the saving and protection expenditure or overhead for each safety module. The overhead for the modification of an existing HDL_module is also reduced by the maintenance of the original VHDL process structure.

Through the structured approach according to the present invention, the risk of a damaging or corruption of the original function caused by a test is minimized.

The present invention facilitates a maximum flexibility for the exclusion and inclusion of even-numbered individual bits of safety registers by using masks for each safety register. The masks can be easily modified and can also be reused by the safety software.

The construction of the implemented write, read and alarm functions in the packet can be adjusted or set as required without influencing the design of the module itself.

The uniform HDL improvements spare a verification overhead in that they enable automatic verification routines.

With the present invention, the synthesis flow does not have to be changed, as the safety measures take place in the HDL design.

Dual redundancy can also be replaced by a triple or higher redundancy with a correction for individual registers, in that only the write, read and alarm functions are replaced by their triple versions or higher-fold versions and signal particulars or information for each further redundant register are added.

BRIEF DESCRIPTION OF THE DRAWINGS

In the following, the invention will be described in detail by means of embodiments and the accompanying drawing, wherein individual functions of the embodiments according to the invention of a method for a non-destructive testing of a register logic will be announced separately by subheadings and will then be described.

In the drawing there is shown in.

DETAILED DESCRIPTION

Figure 1:
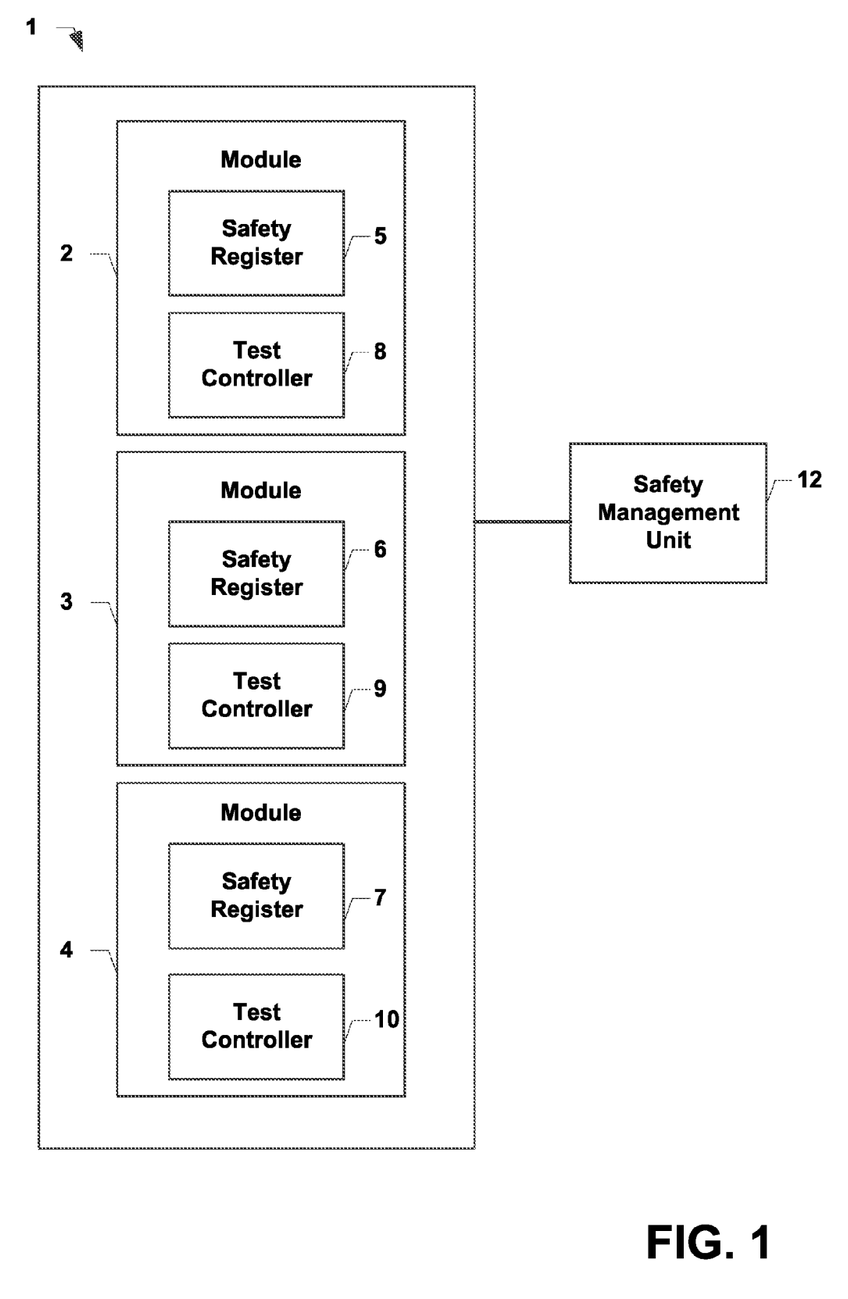
FIG. 1 illustrates a schematic representation of an electronic control system according to various aspects of the disclosure.

As is shown in FIG. 1, the electronic control system 1 comprises a number of modules 2, 3 and 4.

The control system 1 is configured to trigger a safety function under given conditions.

According to FIG. 1, each module 2, 3 and 4 which comprises safety registers 5, 6 and 7, respectively, includes at least one test controller 8, 9 and 10, respectively, which detects the occurrence of an error in one of the safety registers in each operating phase of the control system 1. A controller can also control several modules.

For the sake of simplicity, in the following detailed description it is assumed that a redundant register has the same polarity as in the normal state. In this connection it has, however, to be taken into consideration that the approach implemented by the present invention is also correspondingly applicable for several redundant registers with operating polarities which are individually configurable. In the actual current implementation according to the present invention, for each safety register there can also be provided an inverted duplicate in the form of a redundant register with an inverted data content.

For performing a method for the non-destructive testing of a safety-relevant register logic according to the present invention, first of all test data are generated. One example for the generation of test data for the non-destructive testing of a register logic is represented in the following Table 1:

Each test phase is kept stable for at least 2 (:=clk_div) cycles in order to be able to trigger an alarm impulse of length 1 when a difference occurs. For that there is provided a corresponding (4+clk_div+1) test counter (tcnt) which generates the value tdata as required from the counter status as follows:

Table 1 also shows symbolic values of the original register (sff), of the redundant register or safety flip-flop(sff_dup), and of the expected alarm (alarm). During the test method according to the invention, all combinations of inversions are generated.

In the following assignments, "<sig>'<= . . . " always designates a synchronous assignment which becomes effective in the next clock cycle within the clock domain of the saved register, while "<sig><= . . . " designates an asynchronous assignment.

Read Function

According to another aspect of the present invention, the read function for the retrieval of the original register value ff corrects the current polarity according to the assignment:

ff<=(tdata(1) xor tdata(4) xor sff)

From the above Table 1, however, it does not follow in a self-explaining manner why the switching information (tdata(4:3)) is required. The reason is that, when during a test a new original live data value is written into the safety flip-flop, just like without any saving, its polarity is determined by the functional assignment tdata(2:1). When no external assignment takes place within a specific test cycle, the previous values are switched according to the functional assignment tdata(4:3) in order to maintain the correct polarity according to the current test phase.

Write Function

According to a further aspect of the present invention, the functional assignment of new values to the original register and the redundant register will be determined as follows:

TABLE 1

| tdata(4) | tdata(3) | Tdata(2) | tdata(1) | xalarm | pol | tcnt | w(vali) | sff | sff_dup | alarm | ff |
|---|---|---|---|---|---|---|---|---|---|---|---|
| 0 | 0 | 0 | 0 | 0 | 0 | 0 | val0 | ? | ? | 0 | ? |
| 0 | 0 | 0 | 0 | 0 | 0 | 1 | val1 | val0 | val0 | 0 | val0 |
| 0 | 1 | 0 | 1 | 0 | 0 | 2 | val2 | val1 | val1 | 0 | val1 |
| 0 | 0 | 0 | 1 | 1 | 1 | 3 | val3 | ~val2 | val2 | 1 | val2 |
| 1 | 1 | 1 | 0 | 1 | 1 | 4 | val4 | ~val3 | val3 | 1 | val3 |
| 0 | 0 | 1 | 0 | 1 | 0 | 5 | val5 | val4 | ~val4 | 1 | val4 |
| 0 | 1 | 1 | 1 | 1 | 0 | 6 | val6 | val5 | ~val5 | 1 | val5 |
| 0 | 0 | 1 | 1 | 0 | 1 | 7 | val7 | ~val6 | ~val6 | 0 | val6 |
| 1 | 1 | 0 | 0 | 0 | 1 | 0 | val8 | ~val7 | ~val7 | 0 | val7 |
| 0 | 0 | 0 | 0 | 0 | 0 | 0 | val9 | val8 | val8 | 0 | val8 | wherein the following abbreviations have the following meaning:

tcnt: configurable n-bit counter for the duration of the test cycle: (n = 2 * number_of_redundant registers + clock_division − 1)

pol: current polarity (inversion status) of original register contents xalarm: expected alarm in the current cycle tdata(1): inverted assignment to original, if 1, otherwise not inverted tdata(2): redundant register contents inverted, if 1, otherwise not inverted tdata(3): switch between original register contents, if 1, otherwise don't switch tdata(4): switch between redundant register contents, if 1, otherwise don't switch w(vali): write value "vali" in register "ff"

sff: register which represents the original register, but stored values inverted depending on the test type sff_dup: redundant register, values inverted depending on the test phase alarm: current content of sff /= sff_dup ff: actual corrected register read value identical to the register without saving; the value is used for the normal function: ff := sff xor pol

```
If write(val) then
    sff' <= tdata(1) xor val;
    sff_dup' <= tdata(2) xor val;
else
    sff' <= tdata(3) xor sff;
    sff_dup' <= tdata(4) xor sff_dup;
end if;
``` wherein sff', sff_dup' are used to indicate next states.

In this way, when a new value val is written, this new value will be assigned to sff, sff_dup with or without any inversion, based on the functional assignment tdata(1,2). If no new value will be written, the current values of sff, sff_dup will be switched based on the functional assignment tdata(3,4).

In the scenario represented in the following Table 2, the previous or original value of the safety register to be tested will be inverted, when necessary, within cycles without any writing:

TABLE 2

| tdata(4) | tdata(3) | tdata(2) | tdata(1) | xalarm | pol | Tcnt | w(vali) | sff | sff_dup | alarm | ff |
|---|---|---|---|---|---|---|---|---|---|---|---|
| 0 | 0 | 0 | 0 | 0 | 0 | 0 | val0 | ? | ? | 0 | ? |
| 0 | 0 | 0 | 0 | 0 | 0 | 1 | val1 | val0 | val0 | 0 | val0 |
| 0 | 1 | 0 | 1 | 0 | 0 | 2 | — | val1 | val1 | 0 | val1 |
| 0 | 0 | 0 | 1 | 1 | 1 | 3 | val3 | ~val1 | val2 | 1 | val1 |
| 1 | 1 | 1 | 0 | 1 | 1 | 4 | val4 | ~val3 | val3 | 1 | val3 |
| 0 | 0 | 1 | 0 | 1 | 0 | 5 | — | val4 | ~val4 | 1 | val4 |
| 0 | 1 | 1 | 1 | 1 | 0 | 6 | val6 | val4 | ~val5 | 1 | val4 |
| 0 | 0 | 1 | 1 | 0 | 1 | 7 | val7 | ~val6 | ~val6 | 0 | val6 |
| 1 | 1 | 0 | 0 | 0 | 1 | 0 | — | ~val7 | ~val7 | 0 | val7 |
| 0 | 0 | 0 | 0 | 0 | 0 | 0 | ? | val7 | val7 | 0 | val7 |

The approach according to the invention can be applied analogously also to vectors. The same writing method will be used individually for all bits, i.e. the occurrence of a writing of a new value will be tracked individually for each bit in each cycle.

In the special case in which the write value val has been derived from the previous value of sff (reflexive assignment), on the occasion of the next assignment a difference between sff, sff_dup will disappear, as the same potentially false value will be assigned to sff and sff_dup, wherein the polarity corresponds to the current test state. In order to maintain such a difference, a reflexive assignment to sff_dup can be configured such that it is inverted when the current equivalence relationship between sff and sff_dup differs from the expected one.

For this purpose, the expected alarm xalarm will be compared with the actual alarm. As long as no isolated case effect will occur, normally there applies xalarm=talarm. When either sff or sff_dup are inverted spontaneously, which then takes place not because of the testing, the alarm can be frozen, wherein to the redundant register an inverted value will be assigned which will be converted into the defined reset value, which is identical to sff, only after a reset. It can also be left to the discretion of the developer or design engineer to prevent the freezing by activating the assignment function with the parameter reflexive :=false.

Reflexive Write Function

The alternative assignment function can comprise an additional inversion of sff_dup for the following represented reflexive case:

```
If write(val) then
    sff' <= tdata(1) xor val;
    if reflexive and xalarm = talarm then
        sff_dup' <= tdata(2) xor not val;
    else
        sff_dup' <= tdata(2) xor val;
    end if;
else
    sff' <= tdata(3) xor sff;
    sff_dup' <= tdata(4) xor sff_dup;
end if;
```

Write Function with Destructive Testing

In accordance with a further aspect of the present invention, the same test data tdata(2:1) can also be used for a destructive testing. In this connection, the functional assignment of new values to the original register and the redundant register will be determined as follows:

```
if tdata(2:1) = 0 then
    if write(val) then
        sff' <= val;
        sff_dup' <= val;
    elsif fell(tdata(2:1)) then
        sff' <= rval;
        sff'dup' <= rval;
    else
        sff' <= sff
        sf_dup' <= sff_dup
    end if;
else
    sff' <= tdata(1);
    sff_dup' <= tdata(2);
end if;
```

Thus, in this embodiment of the method according to the invention the control logic as a whole is slightly simpler. In this embodiment and approach according to the invention of and for the destructive testing, each test drives the safety registers into a reset state in which the data contents of the registers to be tested are deleted. This can, however, be unacceptable if the testing is for instance activated during the system start. The two synchronous write methods described above for a destructive and a non-destructive testing do not include the asynchronous reset case for which another write method independent of the test mode is provided which is used for both test approaches.

Parallel Destructive and Non-Destructive Testing

In accordance with another embodiment of the present invention, the logic for the non-destructive and the destructive testing can exist in one design side by side, respectively, and can be applied in parallel to different sets of registers. In such an embodiment, test alarms are expected for all registers to be tested at exactly the same time, as exclusively the relative polarity difference between each original register and redundant register is responsible for an alarm.

Start of the Tests Method

In accordance with a further aspect of the present invention, the test procedure can be started at any time, i.e. also during the operation of the microcontroller. This can for instance take place by setting a test activation input which starts the test counter if it is inactive.

When a destructive testing is to be carried out, consequently the software triggering the test would be responsible for choosing a point in time at which the test shall be started, by writing in a control register in the safety management unit 12.

In this connection, the test controller according to the invention guarantees that the complete test is carried out, in that a test counter can only be stopped by a reset and another start triggering is ignored, while the test mode is still active. Therefore, in the normal mode test the register contents sff and sff_dup are not inverted and normally do not trigger an alarm, except when a real isolated case effect occurs.

Figure 2:
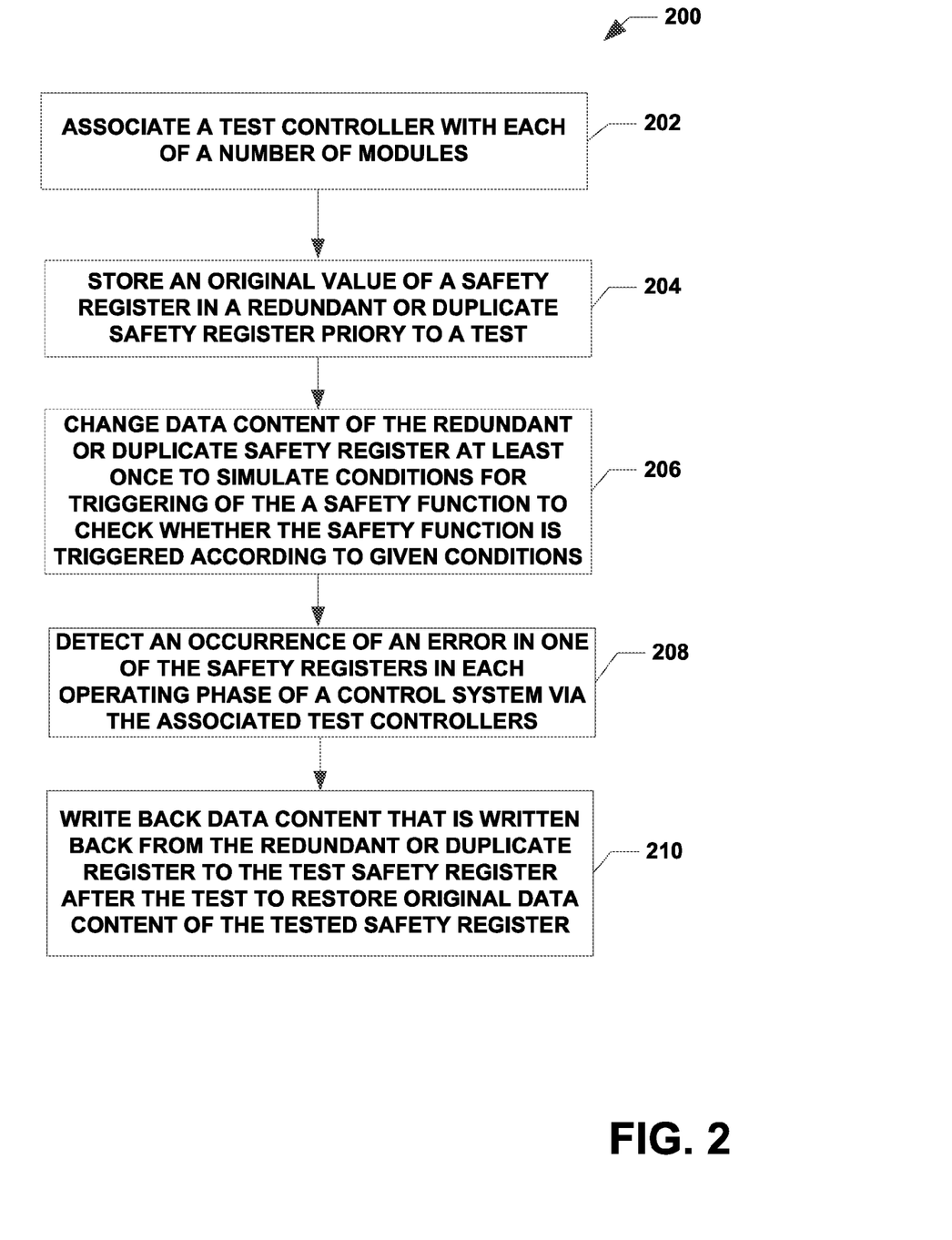
FIG. 2 illustrates a flow diagram for an electronic control system according to various aspects of the disclosure.

FIG. 2 illustrates a method 200. At 202, a test controller is associated with each of a number of modules, respectively. At 204, an original value of a safety register is stored in a redundant or duplicated safety register prior to beginning of a test. At 206, the method comprises changing a data content of the redundant or duplicated safety register at least once to simulate conditions for the triggering of a safety function of the control system in order to check whether the safety function of the control system is triggered according to the given conditions. At 208, an occurrence of an error is detected in one of the safety registers in each operating phase of the control system via the associated test controllers that are provided in each module which comprises such safety register. At 210, a data content that is written back from the redundant or duplicated register to the tested safety register is written back after the test in order to restore original data content of the tested safety register.

Figure 3:
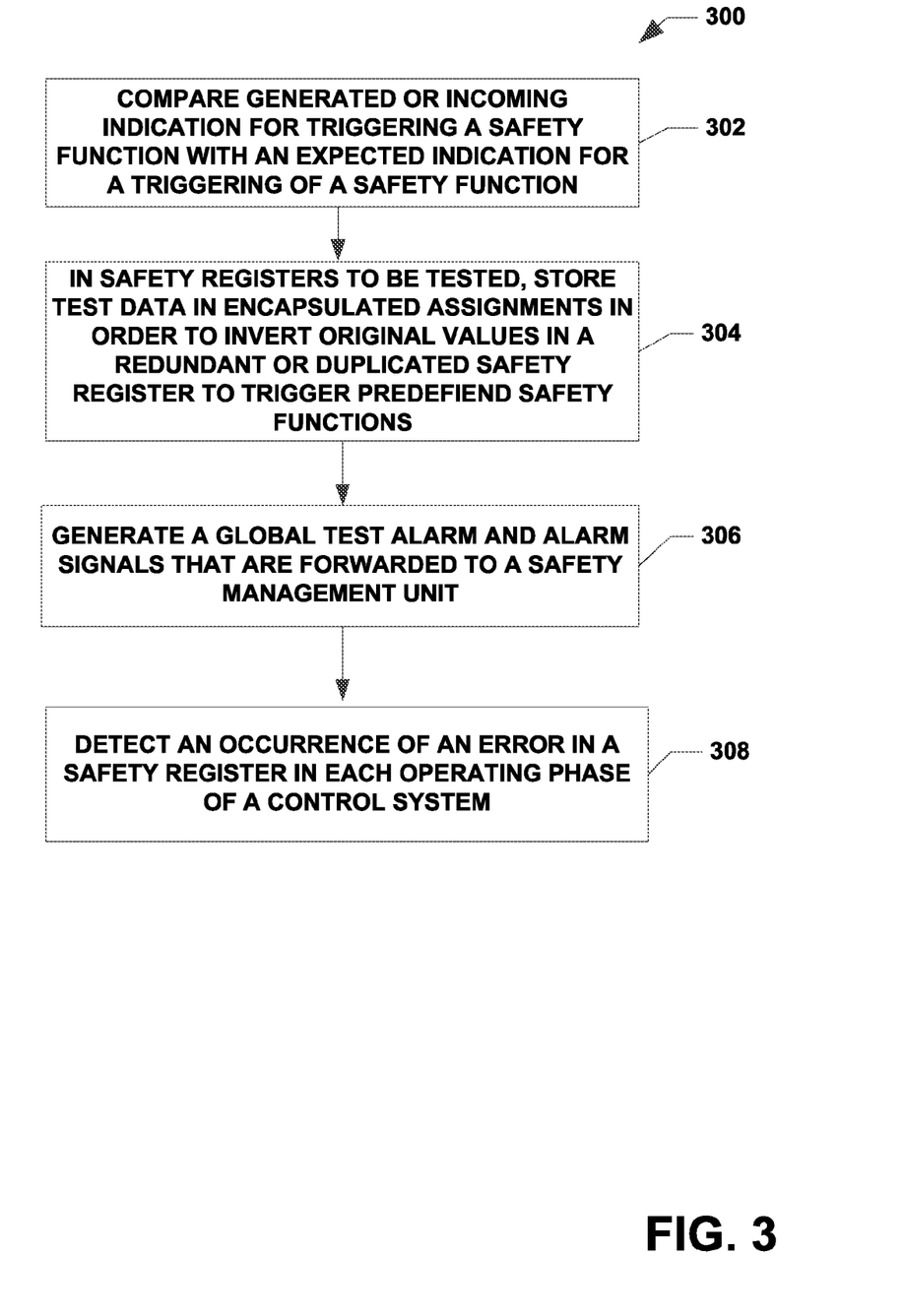
FIG. 3 illustrates a flow diagram for an electronic control system according to various aspects of the disclosure.

FIG. 3 illustrates a method 300. At 302, the method comprises comparing a generated or incoming indication for triggering of a safety function, via a test control logic, with an expected indication for a triggering of a safety function. At 304, test data is stored in safety registers to be tested in encapsulated assignments to invert original values in a redundant or duplicated safety register to trigger predefined safety functions. At 306, global test alarm and alarm signals are generated that are forwarded to a safety management unit. At 308, an occurrence of an error is detected in one of the safety registers in each operating phase of the control system.

Alarm Function

According to another aspect of the present invention, the alarm signal can be generated asynchronously according to the functional assignment:
alarm<=sff xor sff_dup For vectors, the XOR function can be applied bitwise, which leads to an alarm vector.

Alarm Reducing Function

In accordance with a further aspect of the present invention, the alarm vector alarm can be reduced according to the following functional assignment:

alarm_red(0)<=OR_REDUCE(alarm)
alarm_red(1)<=AND_REDUCE (alarm)

Thus, alarm_red(0) indicates that at least one alarm is set, while alarm_red(1) indicates that all alarms are set.

As during the test all original and respective redundant safety registers are inverted simultaneously, the functional condition alarm_red(0)=alarm_red(1) must apply constantly.

In this connection, the following reduction is applied recursively:
alarm_red(0)<=alarm_red_a(1) or alarm_red_b(1)
alarm_red(1)<=alarm_red_a(0) and alarm_red_b(0)

Masking

According to another aspect of the present invention, all assignment and alarm functions are available together with a masking, wherein assignments to redundant registers will only be carried out when the mask contains a 1 at this bit position:

```
if mask(i) then
    sreg_dup'(i) <= value xor tdata(2)
end if;
```

There is no functional assignment for the alternative "else" case in order to enable an optimization during the synthesis in order to remove the bit position.

The masking can also restrict the test assignment to the original register:

```
if mask(i) then
    sff'(i) <= value xor tdata(1)
else
    sff'(i) <= value
end if;
```

Here, the alternative "else" case is necessary in order to carry out the normal assignment.

Only the positions with mask(i)=1 are included in the alarm generation, and the alarm reduction will be modified to:
alarm_red(1)<=AND_REDUCE(alarm or not mask),
wherein alarm and mask are vectors which are combined by vector operators.

The asynchronous read function for the real register value only corrects the masked positions according to the functional assignment:
ff(i)<=(mask(i) and pol) xor sff(i)

As "mask" is a static component, during the synthesis the logic optimization can remove the entire redundant logic for the non-protected bit positions.

Detectable Errors

According to another aspect of the present invention, all errors which are hidden in the main register bits and the redundant register bits or during the alarm generation and in the transmission logic will be found during the test. In this connection, the test phase control itself must not be damaged by an error as otherwise the normal functional behavior of the tested system deviates from the required function. For this purpose, the test counter can be reinforced by triplication in the test controller. As there is only one test controller in each module of the system to be tested, the costs caused by the single triplication will be negligible.

Energy Costs

According to another aspect of the present invention, during the normal operation no switching between the parameters tdata, pol and xalarm takes place, wherein mask and reflexive are constant parameters anyway. The value to be assigned to the original register and to the redundant register will, in one embodiment, be calculated in common prior to the carrying out of their assignment to these two registers. Thus, during normal operation, substantially the following logic is active:

Negation of the assignment value when the redundant register is implemented with inverse polarity.

Comparison of original register and redundant register after each new assignment.

Reduction logic activated when a new alarm occurs. This, however, happens only very seldom during operation.

Hence, for safety registers which are used for the configuration of the system there will be expected no substantial additional energy costs.

The present invention enables a safety management of safety measures and the non-destructive testing of safety-relevant registers which are used for configuring the system, wherein the test method according to the invention can be carried out during each operating phase of a system to be tested.

In accordance with one embodiment, the present invention can be realized by a method for the testing of safety-relevant storage registers (in the following: safety registers) of an electronic control system which comprises a number of modules and is configured to trigger a safety function under given conditions, wherein the occurrence of an error in one of the safety registers is detected in each operating phase of the control system by means of test controllers which are provided in each module which comprises such safety registers.

According to another embodiment, by changing the data content of a safety register at least once, the conditions for triggering a safety function of the control system are simulated in order to check whether the safety function of the control system is triggered according to the given conditions.

According to a further embodiment, prior to the beginning of the test an original value of a safety register is stored in one or several redundant or duplicated safety registers, and by changing the data content of a redundant or duplicated safety register at least one time, the given conditions for triggering a safety function of the control system are simulated in order to check whether the safety function of the control system is triggered according to the given conditions.

According to another embodiment, after the test the data content is written back from the redundant or duplicated register into the tested safety register in order to restore the original data content of the tested safety register.

According to a further embodiment, after the test a corrected majority read value is sent back to the test controller of the respective module by means of a read function from two redundant or duplicated safety registers in order to restore the original data content of the tested safety register with correction protection.

According to a further embodiment, the read value of the safety register to be tested is assigned to an original signal which represents the data content of the respective safety register before the test.

In accordance with a further embodiment, in the safety registers to be tested, test data are stored in encapsulated assignments in order to invert the original values in a redundant or duplicated safety register and to thereby trigger predefined safety functions.

In accordance with another embodiment, the error is detected in one of the tested safety registers by means of an alarm function when differences between the data contents of the tested safety register and its redundant or duplicated register are present and/or these do not correspond to a current test state.

In accordance with a further embodiment there are provided write functions which, based on the test procedure, assign data values with or without inversion to the safety register to be tested and to its redundant or duplicated register so that at certain points of time all bits of the safety register to be tested and of its redundant or duplicated register are either identical or different.

According to another embodiment, the correct data contents are retrieved by means of read functions through negation register contents of redundant or duplicated safety registers based on the current test state.

In accordance with a further embodiment, register assignment functions, read functions and alarm functions of the control system are defined by modifiable mask parameters which include indications with respect to which bits of safety registers to be tested shall be saved prior to the start of the test.

In accordance with another embodiment, individual bits of safety registers can be selected or deselected for a protection prior to data changes by means of a modifiable masking.

In accordance with a further embodiment, the mask parameters for a safety register to be tested are defined in a packet file, and changes thereat are effective automatically in the entire system.

In accordance with another embodiment, for the updating of the safety register, assignment particulars are replaced by predefined assignment functions which comprise function parameters based on assignment values and the test state, and in connection with the read function maintain an original functional behavior of the tested safety register.

In accordance with another embodiment, the type and number of the safety functions and/or the conditions for the triggering of a safety function are configurable in the safety management unit of the electronic control system.

In accordance with a further embodiment, by means of a read function the original data content of the safety register to be tested can be retrieved at any time, i.e. also during a test or during the normal operating mode of the tested system.

According to a further embodiment, the performance of the test can be induced or effected by a user at any point of time, i.e. also during the normal operation of the electronic control system.

In accordance with another embodiment, the safety functions or safety mechanisms of the control system are tested once or repeatedly also during the driving cycle of a vehicle.

In accordance with a further embodiment, the conditions for the triggering of a safety function of the control system are simulated within a given time interval.

In accordance with another embodiment, the test data generated by the test controller can be used for a non-destructive testing in which, after the test, the data content is identical to the original data content of the tested safety register, as well as also for a destructive test in which the original data content of the tested safety register is lost after the test.

In accordance with another embodiment, the present invention can be realized by an apparatus for the testing of safety registers in an electronic control system which comprises a number of modules and which is configured to trigger a safety function under given conditions, wherein each module which comprises such safety registers has at least one test controller which detects the occurrence of an error in one of the safety registers in each operating phase of the control system.

In accordance with another embodiment, a multiple redundancy of the safety register to be tested is provided by a corresponding number of redundant or duplicated registers.

In accordance with another embodiment, for a safety register to be tested there is provided a number of redundant or duplicated registers with or without negation.

In accordance with a further embodiment, the safety register to be tested and the associated redundant or duplicated register are of the same type so that the same predefined functions and methods can be applied thereto.

In accordance with another embodiment, the test controllers in each module are designed to generate and to supply test data which are simultaneously input into safety registers to be tested.

In accordance with a further embodiment, a test control logic is provided which compares a generated or incoming indication for the triggering of a safety function with an expected indication for the triggering of a safety function and generates global test alarm and alarm signals which are forwarded to a safety management unit.

In accordance with another embodiment, the safety registers are designed as configuration or universal registers of relevant system components, critical internal registers, finite state machines and/or counters.

In accordance with another embodiment, the components to be tested comprise a number of safety registers in storage media which can be used in an electronic system for the control of vehicles.

While in the present description certain exemplary embodiments have been described in detail, such embodiments shall only be understood as being illustrative and not restrictive of the scope of protection of the invention. Therefore it shall be pointed out that various modifications can be made in the described, represented or other embodiments of the invention without deviating from the scope of protection and the core of the invention as defined by the attached claims.

We claimed is:

1. A method for a test of safety registers of an electronic control system which comprises a number of modules and is configured to trigger a safety function under given conditions, comprising:
    associating a test controller with each of the number of modules, respectively;
    in safety registers to be tested, storing test data in encapsulated assignments in order to invert the original values in a redundant or duplicated safety register and thereby trigger predefined safety functions; and
    detecting an occurrence of an error in one of the safety registers in each operating phase of the control system via the associated test controllers that are provided in each module which comprises such safety registers.

2. The method according to claim 1, further comprising changing a data content of a safety register at least once to simulate conditions for a triggering of a safety function of the control system in order to check whether the safety function of the control system is triggered according to the given conditions.

3. The method according to claim 1, further comprising:
    storing an original value of a safety register in one or several redundant or duplicated safety registers prior to beginning of the test; and
    changing a data content of a redundant or duplicated safety register at least once to simulate conditions for the triggering of a safety function of the control system in order to check whether the safety function of the control system is triggered according to the given conditions.

4. A method for a test of safety registers of an electronic control system which comprises a number of modules and is configured to trigger a safety function under given conditions, comprising:
    associating a test controller with each of the number of modules, respectively;
    storing an original value of a safety register in a redundant or duplicated safety registers prior to beginning of the test;
    changing a data content of the redundant or duplicated safety register at least once to simulate conditions for the triggering of a safety function of the control system in order to check whether the safety function of the control system is triggered according to the given conditions;
    detecting an occurrence of an error in one of the safety registers in each operating phase of the control system via the associated test controllers that are provided in each module which comprises the one of the safety registers; and
    writing back a data content that is written back from the redundant or duplicated register to the tested safety register after the test in order to restore original data content of the tested safety register.

5. The method according to claim 3, further comprising:
    performing a test by means of a read function from two redundant or duplicated safety registers; and
    sending back a corrected majority read value to the test controller of the respective module in order to restore the original data content of the tested safety register with correction protection.

6. The method according to claim 1, wherein a read value of the safety register to be tested is assigned to an original signal that represents the data content of the respective safety register before the test.

7. The method according to claim 1, further comprising, in safety registers to be tested, generating a read function for triplication with two redundant or duplicated safety registers to return a corrected majority read value to the test controller.

8. The method according to claim 1, further comprising detecting an error in one of the tested safety registers by means of an alarm function when there are any differences between the data contents of the tested safety register and its redundant or duplicated register and/or when these do not correspond to a current test state.

9. The method according to claim 1, further comprising providing write functions that, based on the test procedure, assign data values with or without inversion to the safety register to be tested and to a redundant or duplicated register associated therewith so that at certain points in time all bits of the safety register to be tested and of its associated redundant or duplicated register are either identical or different.

10. An apparatus comprising:
    a memory configured to store executable instructions; and
    a number of modules comprising safety registers and at least one test controller, coupled to the memory, configured to facilitate execution of the executable instructions to perform operations to at least:
        compare a generated or incoming indication for triggering of a safety function, via a test control logic, with an expected indication for a triggering of a safety function;
        generate global test alarm and alarm signals that are forwarded to a safety management unit; and detect an occurrence of an error in one of the safety registers in each operating phase of the control system.

11. The apparatus according to claim 10, wherein at least one module comprises a multiple redundancy of at least one of the safety registers to be tested by a corresponding number of redundant or duplicated registers therein with or without negation.

12. The apparatus according to claim 11, wherein in the at least one module is configured to employ a redundant safety register of the number of redundant or duplicated registers, and wherein the at least one of the safety registers to be tested and the redundant safety register are of a same type.

13. The apparatus according to claim 10, wherein the test controller in each module is configured to generate and supply test data that is input simultaneously into the safety registers to be tested.

14. The apparatus according claim 10, wherein the at least one test controller is further configured to facilitate execution of the executable instructions to perform operations to at least:
in safety registers to be tested, store test data in encapsulated assignments in order to invert original values in a redundant or duplicated safety register and trigger predefined safety functions.

15. The apparatus according to claim 10, wherein the safety registers are configured as configuration or universal registers of relevant system components, critical internal registers, finite state machines and/or counters.

16. The apparatus according to claim 10, wherein the alarm signals are generated asynchronously.

17. The apparatus according to claim 11, wherein the at least one of the safety registers is tested by inverting the at least one of the safety registers and the number of redundant or duplicated registers.

18. The apparatus according to claim 10, wherein the at least one test controller is further configured to facilitate execution of the executable instructions to perform operations to at least:
assign redundant or duplicate registers to the safety registers in response to a mask at a bit position of test data.

19. The apparatus according to claim 10, wherein the at least one test controller is further configured to facilitate execution of the executable instructions to perform operations to at least:
restrict a test assignment to an original register by a masking.

20. The apparatus according to claim 10, wherein the alarm signals that are forwarded to a safety management unit include a mask position of a test data.

* * * * *